UNITED STATES PATENT OFFICE.

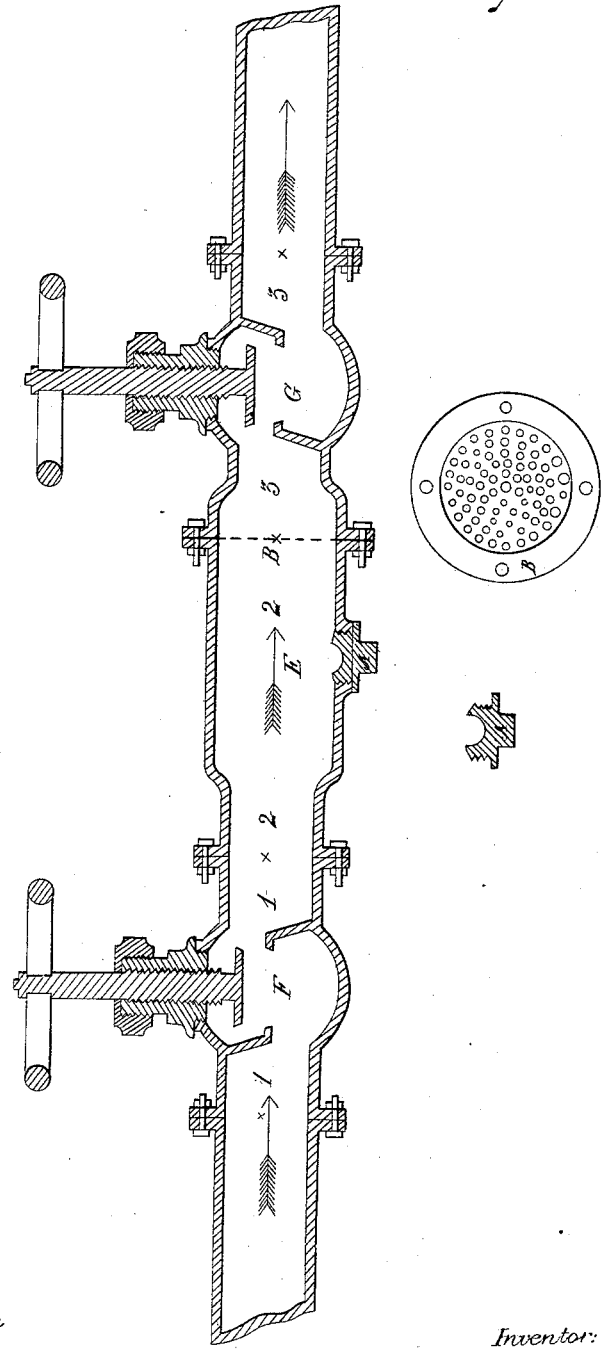

THOMAS D. BOND, OF HOWARD COUNTY, MARYLAND.

IMPROVEMENT IN APPARATUS FOR PREVENTING OBSTRUCTIONS IN WATER-PIPES.

Specification forming part of Letters Patent No. 38,138, dated April 7, 1863.

*To all whom it may concern:*

Be it known that I, THOMAS D. BOND, of Howard county, (near Laurel,) in the State of Maryland, have invented a new and improved mode of preventing water-pipes from becoming clogged or choked by fish, eels, coarse sediment, &c.

The nature of my invention consists in the combination of a trap-chamber, strainer, port-hole, and adjustable valves, for the prevention of clogging or choking water-pipes by fish, eels, coarse sediment, &c.; and I do hereby declare that the following is a full and exact description thereof, reference being had to the accompanying drawings, and to letters of reference marked thereon.

I construct my pipes in any of the known forms in sections 1, 2, and 3. Sections 1 and 3 are pipes with adjustable valves F and G in any of the known forms. Section 2 is the middle or "trap" section, for the reception of fish, eels, coarse sediment, &c., with the strainer B attached for arresting any matter calculated to obstruct the free passage of water through the pipe. The strainer is made of brass or other suitable material having fine holes for straining from the water all coarse substances, the area of the sum of the holes to be equal to the area of the pipe to which it may be attached, thereby allowing the water to flow without impediment. The port-hole A is an ordinary tap into the trap-chamber E, being an outlet to the trap and strainer, which port-hole will discharge therefrom all substances impeding the free passage of water.

This machine is applicable to all water-pipes.

What I claim as my invention, and desire to secure by Letters Patent, is—

The combination, with a water-pipe, of the trap E, the strainer B, the port A, and the adjustable valves F and G, or the equivalents thereof, substantially as described.

THOMAS D. BOND.

Witnesses:
   EDM. F. BROWN,
   JACOB D. FORNEY.